United States Patent [19]
Wolf

[11] Patent Number: 5,427,583
[45] Date of Patent: Jun. 27, 1995

[54] LOW-NOISE, TRIPLE SIDE BAR SPROCKET CHAIN FOR INFINITELY VARIABLE TRANSMISSION

[75] Inventor: Hans J. Wolf, Bad Homburg, Germany

[73] Assignee: P.I.V. Antrieb Werner Reimers GmbH & Co. KG, Bad Homburg, Germany

[21] Appl. No.: 288,583

[22] Filed: Aug. 10, 1994

[30] Foreign Application Priority Data

Sep. 10, 1993 [DE] Germany .................. 43 30 696.9

[51] Int. Cl.6 .................................................. F16G 13/00
[52] U.S. Cl. .................................................... 474/206
[58] Field of Search ................................ 474/206–217

[56] References Cited

U.S. PATENT DOCUMENTS

| | | |
|---|---|---|
| 3,089,346 | 8/1961 | Dittrich et al. . |
| 3,344,761 | 8/1962 | Steuer . |
| 3,353,421 | 11/1965 | Ketterle et al. . |
| 3,364,767 | 11/1965 | Bredschneider et al. . |
| 3,916,709 | 11/1975 | Steuer et al. . |
| 4,581,001 | 4/1986 | Rattunde et al. . |
| 4,909,778 | 3/1990 | Schonnenbeck . |
| 4,915,675 | 4/1990 | Avramidis ................ 474/213 |
| 4,915,676 | 4/1990 | Komeya .................... 474/213 |
| 5,147,251 | 9/1992 | Cole, Jr. ................ 474/212 X |

FOREIGN PATENT DOCUMENTS 1979429  2/1968  Germany .

*Primary Examiner*—Michael Powell Buiz
*Attorney, Agent, or Firm*—Frishauf, Holtz, Goodman & Woodward

[57] ABSTRACT

To permit the advantage of low-noise operation, obtainable by using links of respectively different lengths in a sprocket chain built in the triple side bar arrangement, while providing longitudinal guidance to the links and preventing interference of longer links with shorter links, some of the chain links (1, 10) have the side bars (1a, 10a) formed with a projecting nose (12, 14), positioned on at least one end portion of the respective side bar of the link, the projection extending towards the next sequential chain link, with a maximum extent up to the joint piece or rocker element (3) interconnecting the links together.

7 Claims, 1 Drawing Sheet

LOW-NOISE, TRIPLE SIDE BAR SPROCKET CHAIN FOR INFINITELY VARIABLE TRANSMISSION

Reference to related patents, the disclosures of which are hereby incorporated by reference, assigned to the assignee, or a related company of the assignee, of the present application:

U.S. Pat. No. 3,089,346, Dittrich and Steuer
U.S. Pat. No. 3,353,421, Ketterle, Steuer and Pataky
U.S. Pat. No. 3,364,767
U.S. Pat. No. 3,916,709, Steuer, Pataky and Ketterle
U.S. Pat. No. 4,344,761, Steuer
U.S. Pat. No. 4,581,001, Rattunde and Schopf
U.S. Pat. No. 4,909,778, Schonnenbeck.
Reference to related publication:
German Utility Model DE-GM 1 979 429.

FIELD OF THE INVENTION

The present invention relates to a sprocket chain for infinitely variable transmissions of the movable cone disk type, in which the sprocket chain is constructed for low-noise operation, and in which the individual links, and especially the side bars of the links, are located in triple side bar arrangement, so that packages or groups of sprocket links are formed which are interconnected by link connection elements to permit flexing of the individual links with respect to each other. The interconnecting elements extend transversely to the running direction of the chain and carry, at their ends, pressure reception elements for frictional engagement with the cone disks of the transmission. Low-noise operation is obtained by preventing sympathetic vibrations resulting from the running of the links between the cones from arising by spacing the linkage elements, connecting individual side bars, by different distances in sequential links, for example by making the side bars of the sprocket chain of different lengths, distributed regularly or irregularly along the length of the chain.

BACKGROUND

Sprocket chains of the type to which the present invention relates are well known; for example, the referenced U.S. Pat. No. 4,344,761, Steuer, describes a chain which is composed of packs of side bars which form successive links. The links are connected with one another for articulation. Thrust or pressure pieces act transversely of the longitudinal direction of the chain for friction force transmission between cone disk pulleys and the side bar chain. The length of selected ones of the links between associated articulations are made differently from those of the remainders of the links of the chain.

Various types of these sprocket chains are known. For example, the sprocket chains described in the referenced U.S. Pat. No. 3,089,346, Dittrich et al, can use rocker elements to form the links with the pressure element for friction or force transmission. These rocker elements cross a packet or cartridge of side bar links, as well as clamping brackets to hold the side bars together. The rocker elements extend transversely to the longitudinal direction of the chain and pass through suitably provided openings, so that the end faces of the rocker elements can engage in frictional contact with the cone disks of the transmission. U.S. Pat. No. 3,364,767, describes a construction in which the links of the chain are articulatedly connected by joint bolts. T-shaped pressure elements are fitted between the respective joint bolts and inserted into the packages or groups of links; the pressure elements provide for the required force transmission.

More recent constructions, as exemplified for example by U.S. Pat. No. 3,353,421, Ketterle et al, as well as by U.S. Pat. No. 3,916,709, Steuer et al, utilize the pairs of the rocker elements interconnecting the links simultaneously as the pressure elements to provide frictional engagement with the cone disks or cone pulleys of the transmission.

German Utility Model DE-GM 19 79 421 describes a different construction, in which packages or groups or links are provided forming the respective link elements of the chain, interconnected by link bolts. The packages of the links, which include the side bars, are surrounded by pressure rings, positioned between the locations of the joint bolts. The pressure rings are rotatable about an axis parallel to the longitudinal direction of the chain, for rotation about the packages of links. These pressure rings are in frictional engagement with the cone disks or cone pulleys of the transmission.

When an articulated chain runs into the pulley pair formed by facing cone pulleys, impacts arise as the chain enters the conical portion between the pulleys. These impacts, between the pressure elements and the cone pulleys themselves, generate undesired noise.

To solve the noise problem, it has been proposed (see U.S. Pat. No. 4,344,761, Steuer) to change the spacing between the individual links in order to interfere with resonance phenomena, and thus dampen or break up any resonant noise. This change in the division spacing between links has to be carefully constructed, so that the energy transmission between the chain and the pulleys is not interfered with; further, the construction of the chain should not basically change; it must be interchangeable with other chains. The length of selected ones of the links, between associated articulations, are made differently from those of the remainder of the links of the chain to minimize vibrations between the chain and the associated cone pulleys during operation of the transmission.

It has been found when the difference between length of link is in the order of 30% of "normal" length, difficulties arise in high-performance chains. Particularly, if this type of construction is used in a triple side bar arrangement, in which a plurality of links are stacked laterally, with respect to the operating direction of the chain, lateral guidance of the chain can be lost with respect to adjacent links. If adjacent lateral links slip sideways, end-engagement of the links may arise and, in operation, the chain could reach a position in which the links block each other, which, if sufficient power is applied to the chain, might result in rupture of the chain.

THE INVENTION

It is an object to improve a chain having a triple side bar arrangement, and which can also utilize the advantage of low-noise operation by using links of different lengths, and which provides for stable guidance of the chain, while eliminating the danger of instability of the sprocket chain and possible rupture of the linkage connection of the individual links of the chain.

Briefly, those links which are associated with an increased link length are formed with a projection or extending portion on at least one of the two radial end regions—with respect to the running direction of the chain. This extension or projection can reach up to the next adjacent joint element or connecting joint piece.

The present invention is specifically directed to chains which are constructed in triple side bar arrangement. The difference between a dual side bar arrangement and a triple side bar arrangement is well known, and described, in detail, in the referenced U.S. Pat. No. 4,581,001, Rattunde et al, see particularly FIGS. 1-3 of this patent, and the associated specification. Briefly, in a dual or double side bar structure, two lateral end webs of adjacent chain side bars stand side-by-side between two successive pairs of rocker elements or cross-connecting pieces; in a triple side bar structure, however, three successive side bars are located laterally next to each other, staggered, each, by one chain pitch in relation to one another—with respect to the running direction of the chain. This arrangement, while resulting in a 50% widening of the chain transversely of the running direction, makes it possible to reduce the distance between successive joints formed by pairs of rocker elements or connecting pieces or elements to about one-half with respect to a double side bar structure, thus improving the flexibility of the chain.

In accordance with a feature of the present invention, preferably all the side bars of the chain links are formed with extensions or projections to ensure that they are always laterally guided with respect to each other and cannot come into end-on-end or end edge contact with respect to each other. This permits changes of the normal chain link repetition distance which in turn permits a deviation of for example 30% between respective link structures. The problem which arises, and which is solved by the present invention, occurs only in the triple side bar arrangement, as above defined. Chains constructed in the double side bar arrangement do not have this problem. The difference between double side bar and triple side bar arrangements is highlighted in the above-referenced U.S. Pat. No. 4,581,001, Rattunde et al.

In accordance with a feature of the invention, the projection or extension of the respective links is preferably formed as a projecting nose or the like, positioned symmetrically between the upper and lower edge of the link, or any other suitable extension. Preferably, this projection is rounded at the outer end.

DRAWINGS

FIG. 1 is a highly schematic side view of a chain in accordance with the present invention, omitting any features not material to the understanding of the present invention; and FIG. 2 is a top view, partly in section, of a wide chain, as illustrated in FIG. 1.

DETAILED DESCRIPTION

Figure 1:
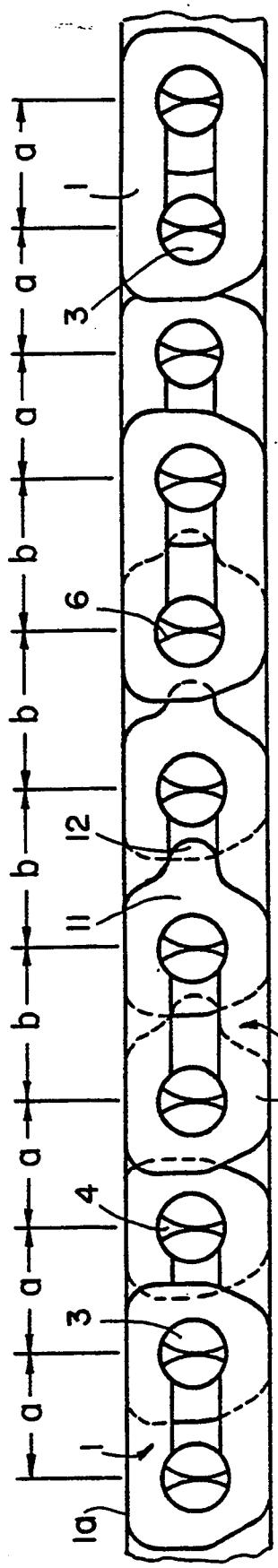

The drawings illustrate a piece from a length of sprocket chain, built up, basically, of normal or group one (group I) of links 1. The links 1 are formed by side bar elements 1a. The side bar elements are interconnected by joint pieces, shown as rocker elements 3, in an articulated manner. The side elements 3 are provided in pairs, fitted into openings 4 of the side bars 1a. They are located in the side bars with an interengaging fit to permit articulation of the side bars with respect to the link elements.

The link elements 3 have convex rocker surfaces 6 which can roll off against each other to provide for the articulated connection of adjacent links 1.

Figure 2:
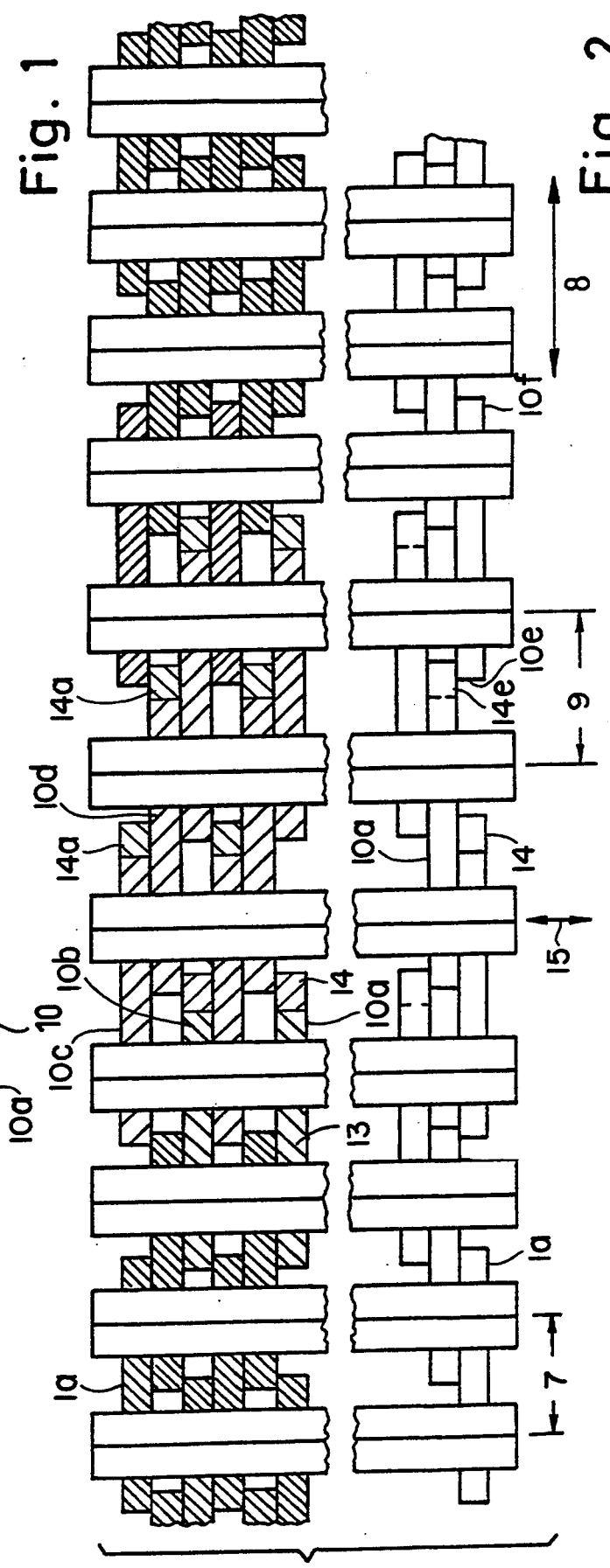

The spacing of the links, from center to center, is illustrated in FIG. 2 as a spacing 7. This is also referred to as the pitch of the chain. The direction of running of the chain, which can also be referred to as the longitudinal direction of the chain, is shown by the arrow 8, and this will be the reference dimension in the further description of this invention. The size of the division 7 depends on the size of the rocker elements or joint pieces or joint elements 3, as well as the distance between the respective engagement surfaces of these rocker elements.

As clearly seen in the drawing, the normal or standard pitch 7 (shown in FIG. 1 as the spacing a) should not be maintained throughout the length of the chain to eliminate noise due to repetitively recurring impacts as the runs between cone pulleys. Thus, the pitch of the chain changes along the length of the chain by increasing the pitch to distances 9, see arrow b in FIG. 1. Thus, the individual impact noise of link positions, which are also furnished with end engagement pressure or friction elements, between the cone pulleys of the transmission will not recur repetitively.

In accordance with the present invention, the side bars 10a associated with the enlarged or extended links 10 are formed with an extension or projection 12 extending from the end portion 11. This projection 12 extends beyond the side bar 10 up to the next adjacent joint piece or rocker element 3. Thus, the side bar 10a is laterally guided with respect to the subsequent link, in the running direction of the chain, and lateral slippage of a respective link 10 with regard to an adjacent link is reliably prevented.

As best seen in FIG. 2, intermediate side bars 13 which, effectively, form the transition between one chain pitch 7 and the next chain pitch 9, are likewise supplied with projections 14.

The lateral slippage, schematically indicated by arrow 15, is thus reliably prevented, as best seen when considering the projection 14a; if it were absent, link 10a, 10b, 10c or 10d might engage the end face 10e of an adjacent side bar 10f. The extension 14e, however, guides the respective side bar reliably between the adjacent side bar 10f and the next adjacent inwardly located side bar.

For simplicity, the cross-hatched portion of the side bars 10a, 10b, 10c, 10d are further provided with a boldface subdivision line to illustrate the extension 14a of the respective side bars.

The chain, as illustrated, permits in a simple manner to vary the pitch spacing a, b . . . , respectively, within a wide range without interfering with the operating effectiveness of the chain, and maintaining the chain in longitudinal alignment. The operating effectiveness, thus, is ensured by the projections 12, 14 in a simple manner, without substantially increasing the weight of the chain, or complicating the manufacture of the chain links and the side bars.

I claim:

1. Low-noise, triple side bar sprocket chain for infinitely variable cone-pulley or cone-disk transmissions, having
   a plurality of sequentially arranged chain links (1, 10) formed of individual side bars, and further formed with apertures (4) therein, and joint pieces (3) connecting the links together, passing through the apertures (4) and extending laterally of the side bars to permit pressure engagement therewith by the transmission cone disks, said chain links being located in the sprocket chain in a triple side bar arrangement, wherein said sprocket chain has at least two groups (1, 10) of chain links, of respectively different lengths/(a, b; 7, 9), measured in the operating direction (8) of the chain, said groups of links of respectively different lengths/repeating in regular or irregular sequence (7, 9) along the chain to reduce operating noise thereof, wherein, in accordance with the invention, at least some of the chain links (1, 10) are formed with a projection (12) on at least one end portion of the respective link (10a), said projection (12, 14) extending towards the next sequential chain link (1, 10) with a maximum extent up to the joint piece (3), or a lateral extension thereof, of the next sequential chain link.

2. The chain of claim 1, wherein some of those chain links (10a) which are formed with said projection (12) are located between sequential shorter and longer chain links.

3. The chain of claim 1, wherein the projection (12, 14) is narrower than the width of the respective chain link (10a) from which it extends.

4. The chain of claim 3, wherein said projection (12, 14) is located symmetrically with respect to the width of the respective chain link, and has a rounded end.

5. The chain of claim 1, wherein the projection (12, 14) is located within the region of a longitudinal line of symmetry and formed as a laterally rounded projecting nose, integral with the side bar of the respective link.

6. Low-noise, triple side bar sprocket chain for infinitely variable cone-pulley or cone-disk transmissions, having a plurality of sequentially arranged chain links (1, 10) formed of individual side bars, and further formed with apertures (4) therein, and joint pieces (3) connecting the links together, passing through the apertures (4) and extending laterally of the side bars to permit pressure engagement therewith by the transmission cone disks, said chain links being located in the sprocket chain in a triple side bar arrangement, said sprocket chain has at least two groups (1, 10) of chain links respectively differently spaced, measured in operating direction of the chain, said groups (1, 10) of links repeating in regular or irregular sequence (7, 9) along the chain, to reduce operating noise, wherein, in accordance with the invention, at least some of the chain links (1, 10) are formed with a projection (12, 14) on at least one end portion of the respective link (10a), said projection (12) extending towards the next sequential chain link (1, 10) with a maximum extent up to the joint piece (3), or a lateral extension thereof, of the next sequential chain link.

7. The chain of claim 6, wherein the projection (12, 14) is located within the region of a longitudinal line of symmetry and formed as a laterally rounded projecting nose, integral with the side bar of the respective link.

* * * * *